United States Patent

Dan et al.

[11] Patent Number: 5,094,433
[45] Date of Patent: Mar. 10, 1992

[54] VIBRATION ISOLATING DEVICE

[75] Inventors: Takuya Dan; Nobuaki Fujiwara, both of Yokohama, Japan

[73] Assignee: Bridgestone Corporation, Tokyo, Japan

[21] Appl. No.: 214,807

[22] Filed: Jul. 5, 1988

Related U.S. Application Data

[63] Continuation of Ser. No. 2,348, Jan. 12, 1987, abandoned, which is a continuation of Ser. No. 640,621, Aug. 14, 1984, abandoned.

[30] Foreign Application Priority Data

Aug. 15, 1983 [JP] Japan .................. 58-148946

[51] Int. Cl.⁵ .................. F16F 9/34; F16F 13/00
[52] U.S. Cl. .................. 267/140.1 A; 138/30; 138/42; 180/312; 248/562; 248/636; 267/219
[58] Field of Search .................. 267/140.1, 219; 248/562, 632, 634, 636; 138/30, 42; 280/710, 716; 180/300, 312, 902

[56] References Cited

U.S. PATENT DOCUMENTS

| | | | |
|---|---|---|---|
| 4,159,091 | 6/1979 | LeSalver et al. | 267/113 X |
| 4,383,679 | 5/1983 | Kakimoto | 267/8 R |
| 4,391,435 | 7/1983 | Pham | 267/140.1 |
| 4,422,779 | 12/1983 | Hamaekers et al. | 267/219 X |
| 4,502,575 | 3/1985 | Fukushima et al. | 188/320 X |
| 4,505,461 | 3/1985 | Kakimoto | 267/140.1 |
| 4,588,173 | 5/1986 | Gold et al. | 267/140.1 |
| 4,595,183 | 6/1986 | Dan et al. | 267/140.1 |

FOREIGN PATENT DOCUMENTS

| | | | |
|---|---|---|---|
| 27751 | 4/1981 | European Pat. Off. | 267/140.1 |
| 40290 | 11/1981 | European Pat. Off. | 267/140.1 |
| 2041488 | 9/1980 | United Kingdom | 267/140.1 |
| 2068079 | 8/1981 | United Kingdom | 267/140.1 |

Primary Examiner—George E. Halvosa
Attorney, Agent, or Firm—Sughrue, Mion, Zinn, Macpeak & Seas

[57] ABSTRACT

A vibration isolating device is disclosed, which comprises two vibration-damping liquid chambers, and a partition member interposed between the two liquid chambers and provided with a restricted passage therein. In this device, the partition member comprises a pair of lapped plate materials, at least one of which is provided with a depression for defining the restricted passage in the lapping of the plate materials.

4 Claims, 7 Drawing Sheets

FIG_6
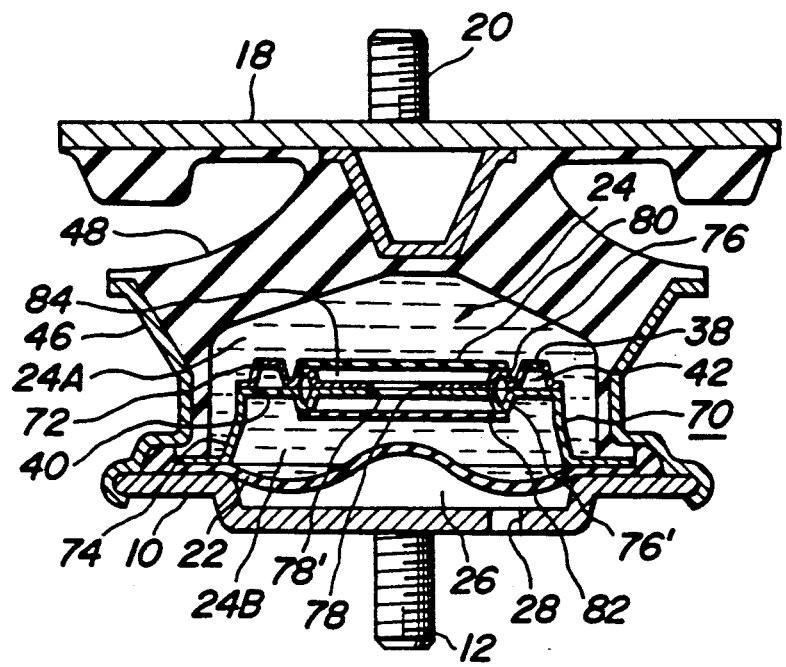
FIG_7
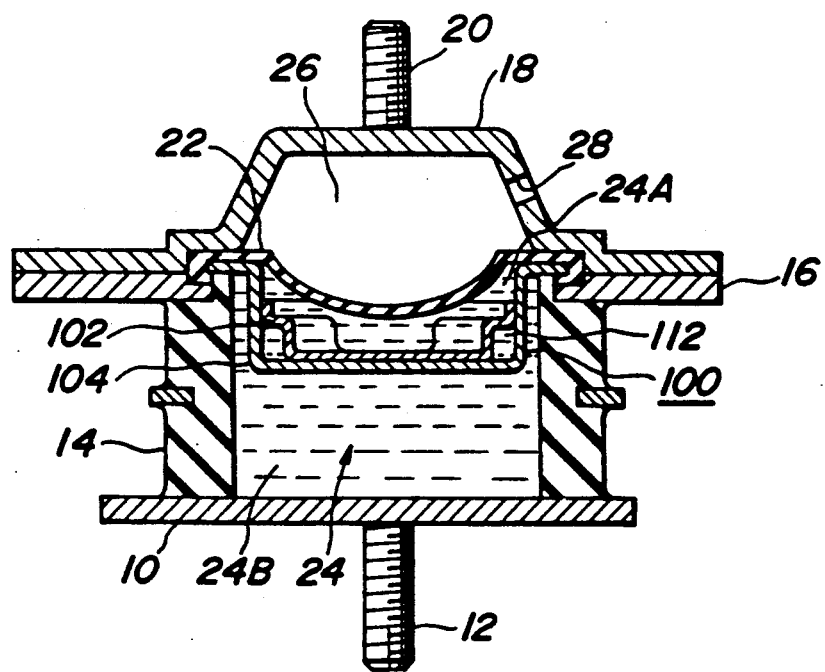

FIG_8
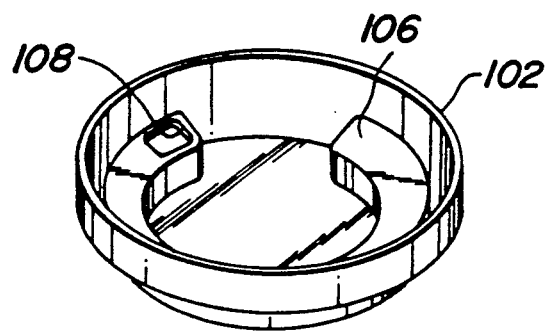
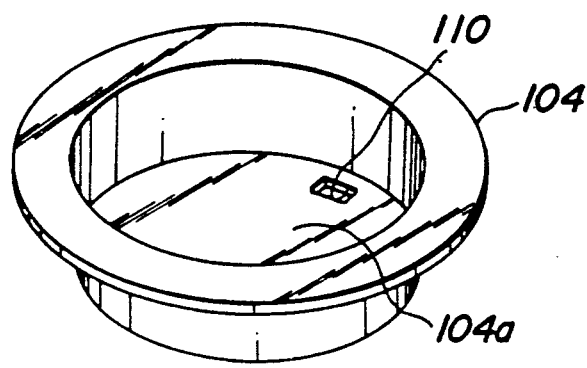
FIG_9
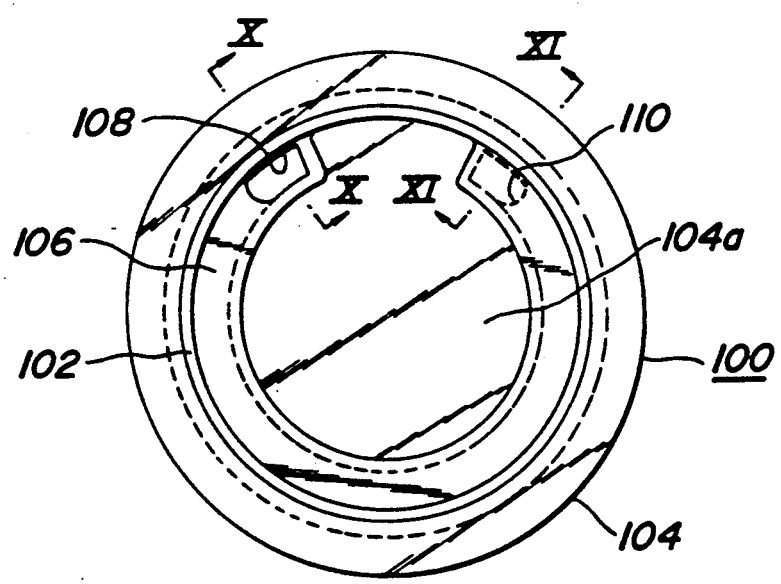

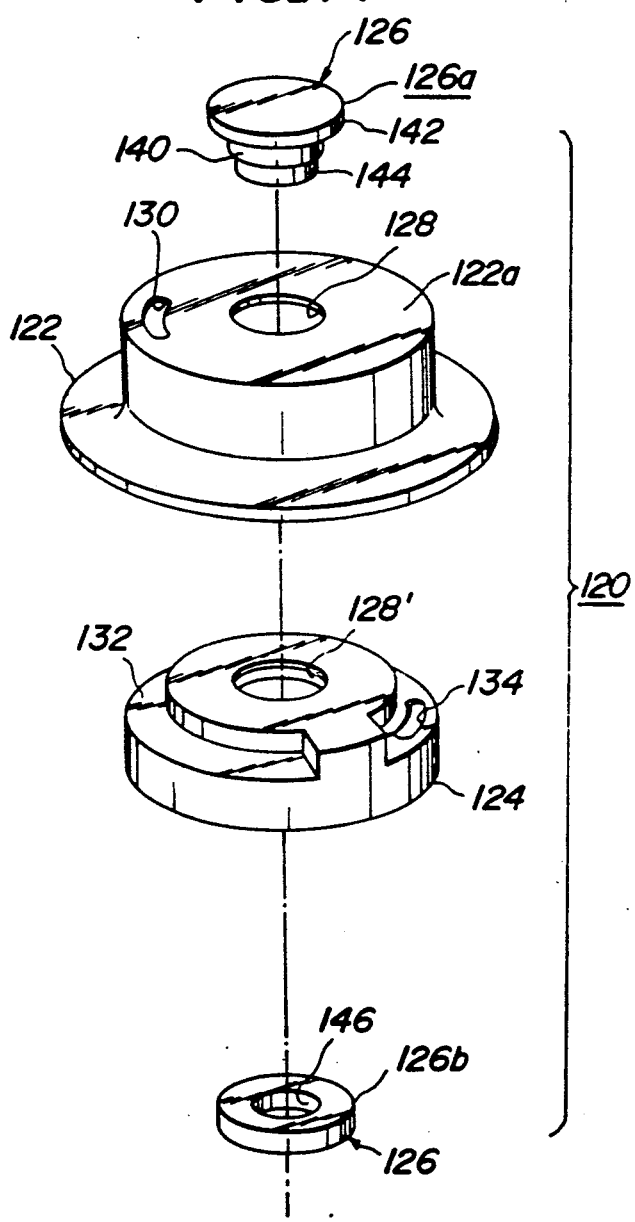
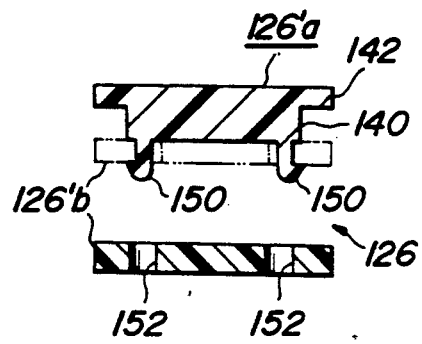
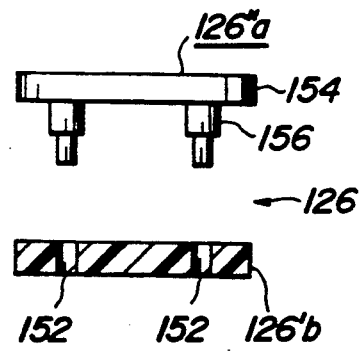

VIBRATION ISOLATING DEVICE

This is a continuation of Ser. No. 70/002,348, filed on Jan. 12, 1987 which is a continuation of Ser. No. 06/640,621, filed on Aug. 14, 1984, both now abandoned.

BACKGROUND OF THE INVENTION

1. Field of the Invention

This invention relates to a vibration isolating device for damping vibrations from vibration source, and more particularly to an improvement of a partition member provided with a restricted passage, which divides a vibration isolating body into two liquid chambers and defines a flow resistance to the liquid to thereby produce a damping action, in the vibration isolating device.

2. Description of the Prior Art

The vibration isolating device such as a rubber vibration isolator is used, for instance, as an engine mount for automobile vehicles, whereby vibrations from an internal-combustion engine are absorbed so as not to be transmitted to a vehicle chassis.

As the vibration isolating device of this type, there has been proposed a vibration isolating device comprising two vibration-damping liquid chambers separated by a partition member provided with a restricted passage, in which vibrations from vibration source are absorbed by a flow resistance subjected to the liquid when the vibration is transmitted to the one chamber to thereby flow the liquid from the one chamber to the other through the restricted passage or the orifice.

In this connection, a large damping effect can be produced by prolonging the longitudinal size of the orifice. For this end, there have hitherto been adopted a method wherein a component provided at its outer surface with a spiral groove is inserted in an inner sleeve to form a spiral-type long orifice as in the U.S. Pat. No. 4,277,056, a method of using a pair of disc-like cast articles provided with a communication groove (Japanese Patent laid open No. 57-9,340), and the like.

In these methods, however, the cutting and casting operations requiring a long working time are used, so that the production is complicated and the cost thereof increases.

SUMMARY OF THE INVENTION

Under the above circumstances, the invention is to provide an orifice structure of a partition member for use in the vibration isolating device which can simply be produced with the reduction of the cost.

According to the invention, the partition member comprises a pair of lapped plate materials, at least one of which being provided with a depression for defining a restricted passage in the lapping of these plate materials, and each of which being provided with an opening communicating to the restricted passage.

BRIEF DESCRIPTION OF THE DRAWING

The invention will now be described with reference to the accompanying drawing, wherein:

FIG. 6 is a sectional view of a third embodiment of the vibration isolating device according to the invention;

FIG. 7 is a sectional view of a fourth embodiment of the vibration isolating device according to the invention;

FIGS. 8 and 9 are exploded perspective view and top plan view of the partition member shown in FIG. 7, respectively;

FIG. 14 is an exploded perspective view of the partition member and movable member shown in FIG. 13; and FIGS. 15 and 16 are exploded sectional views of the other embodiments of the movable member used in the invention.

Like parts are designated by like numerals throughout the different figures of the drawing.

DESCRIPTION OF THE PREFERRED EMBODIMENTS

Figure 1:
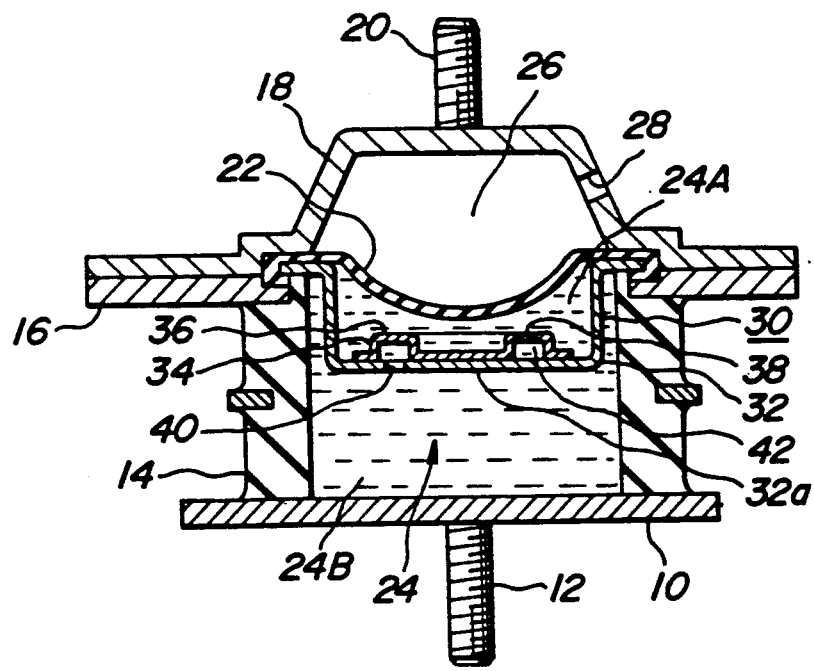
FIG. 1 is a sectional view of a first embodiment of the vibration isolating device according to the invention.

In FIG. 1 is sectionally shown a first embodiment of the vibration isolating device provided with the partition member according to the invention.

This vibration isolating device is used as an engine mount for automobile vehicle and comprises a rigid bottom plate 10 provided at the central lower side with a fitting bolt 12, which is fixed to a vehicle chassis (not shown).

A rubber elastomer 14 of a hollow cylindrical form is bonded by vulcanization at the lower end to the upper surface of the bottom plate 10. On the other hand, the rubber elastomer 14 is bonded by vulcanization at the top end to a lower surface of an annular disc-type joint plate 16, to the upper surface of which is fixed a rigid top plate 18. This top plate 18 is raised at its central portion and provided at the central upper side with a fitting bolt 20 for carrying and fixing an engine (not shown).

An elastic diaphragm 22 is clamped at its outer peripheral portion between the joint plate 16 and the top plate 18, which forms a liquid chamber 24 together with the bottom plate 10 and the rubber elastomer 14 on the one hand and an air chamber 26 together with the raised portion of the top plate 18 on the other hand. The air chamber 26 communicates with the exterior through a hole 28 formed in the top plate 18. Therefore, the elastic diaphragm 22 may be subjected to elastic deformation in a direction of reducing the air chamber 26 by the pressure increase of the liquid chamber 24.

According to the invention, a partition member 30 is disposed in the liquid chamber 24. This partition member 30 is constituted by lapping a pair of plate materials 32, 34 one upon the other, and divides the liquid chamber 24 into an upper liquid chamber 24A and a lower liquid chamber 24B.

As the plate material, use may be made of thin metal sheet, synthetic resin sheet and the like. For instance, the disc-type thin metal sheet is subjected to deep drawing, stamping or the like to form a desired depression for defining a restricted passage in the lapping of two sheets. Alternatively, the synthetic resin sheet having a desired depression may be manufactured by transfer molding, casting, injection molding or the like.

Figure 2:
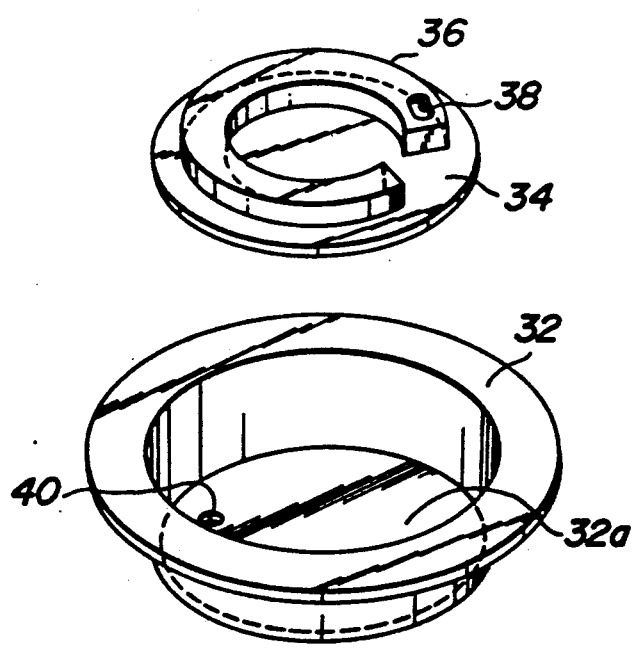
FIG. 2 is an exploded perspective view of the partition member shown in FIG. 1.

In the embodiment of FIG. 1, the partition member 30 is formed by lapping and fixing two plate materials 32 and 34 as shown in FIG. 2. The plate material 32 is a hat-shaped body formed by deep drawing a disc metal sheet and is clamped and secured at the radially extending peripheral portion between the elastic diaphragm 22 and the rubber elastomer 14. To a recess bottom 32a of the plate material 32 is fixed the plate material 34 of a disc shape provided with a depression 36 corresponding to a C-shaped groove recess, which is formed by stamping or the like. Moreover, an opening 38 is formed in one end portion of the depression 36, through which the upper liquid chamber 24A is in communication with the inside of the depression 36. On the other hand, an opening 40 is formed in the recess bottom 32a at a position corresponding to the middle of the depression 36 or the other end portion of the depression 36 opposing to the opening 38, through which the lower liquid chamber 24B is in communication with the inside of the depression 36. Therefore, when the plate materials 32 and 34 are lapped and fixed to form the partition member 30 as shown in FIG. 1, the inside of the depression 36 forms a restricted passage or orifice 42 communicating the upper liquid chamber 24A to the lower liquid chamber 24B through only the openings 38 and 40.

In the vibration isolating device having the structure shown in FIG. 1, vibrations generated by the working of the engine mounted on the top plate 18 are transmitted to the device through the top plate 18 and damped as follows. That is, since the rubber elastomer 14 acts as a main vibration-absorbing body, the vibration can be absorbed by the vibration-damping performance based on the internal friction of the rubber elastomer 14. Further, since the liquid flows between the upper and lower liquid chambers 24A and 24B through the orifice 42, the vibration-damping effect can be further enhanced by the viscosity resistance caused in the flowing of the liquid through the orifice 42.

Particularly, the orifice 42 is defined between the groove recess of the plate material 34 and the bottom recess of the plate material 32 when lapping these plate materials one upon the other, while the plate materials 32 and 34 are rendered into a desired shape by deep drawing or stamping of the disc sheet, so that the formation of the effective orifice 42 becomes very cheap. Moreover, the longitudinal size of the orifice 42 may easily be controlled by rotating the plate material 34 on the recess bottom 32a of the plate material 32 at a proper angle in the circumferential direction to adjust the distance between the openings 38 and 40.

Although the depression 36 is formed only in the plate material 34 in the embodiment of FIG. 1, such depression 36 may be formed in the recess bottom 32a of the plate material 32 to make the volume of the orifice 42 large. Moreover, the depression 36 is formed as the C-shaped groove in the illustrated embodiment, but it may take any form such as O-shaped form or the like without departing from the spirit of the invention. That is, the depression 36 may be shaped into various forms satisfying the required volume of the orifice 42.

Figure 3:
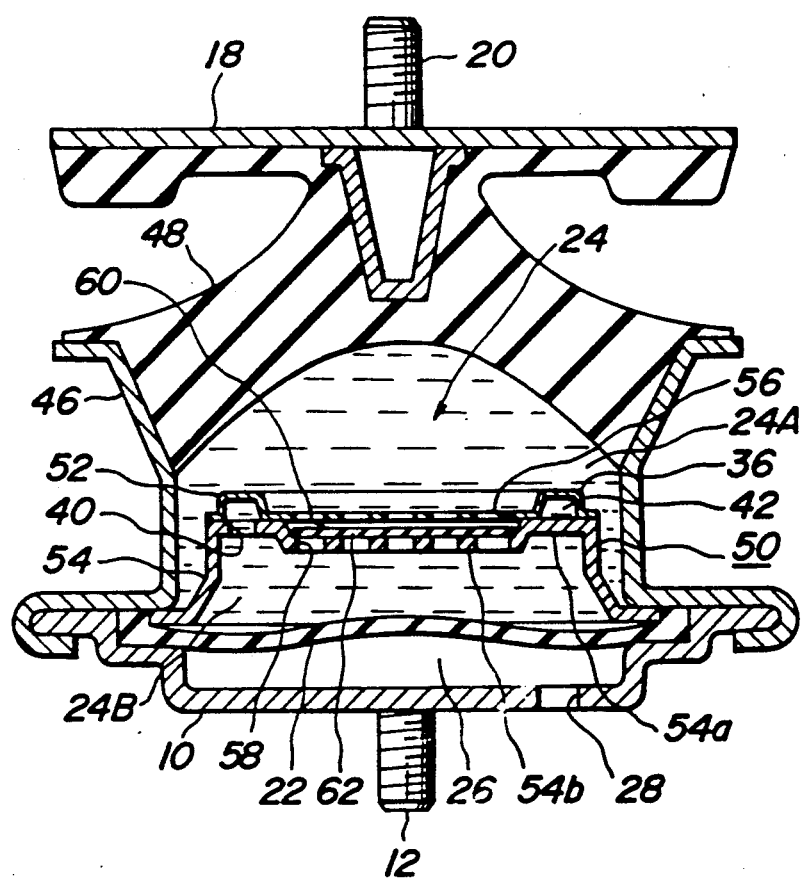
FIG. 3 is a sectional view of a second embodiment of the vibration isolating device according to the invention.

In FIG. 3 is sectionally shown a second embodiment of the vibration isolating device according to the invention, wherein a cylindrical shell 46 is fixed by caulking at one end to the outer periphery of the bottom plate 10, and a rubber elastic member 48 is bonded by vulcanization at the lower and outer periphery to the inner periphery of the upper part of the cylindrical shell 46. The rubber member 48 is also bonded by vulcanization at the top surface to the top plate 18. Further, the elastic diaphragm 22 is clamped at the outer periphery between the bottom plate 10 and the cylindrical shell 46, which forms the liquid chamber 24 together with the cylindrical shell 46 and the rubber member 48 on the one hand and the air chamber 26 together with the bottom plate 10 on the other hand.

Figure 4:
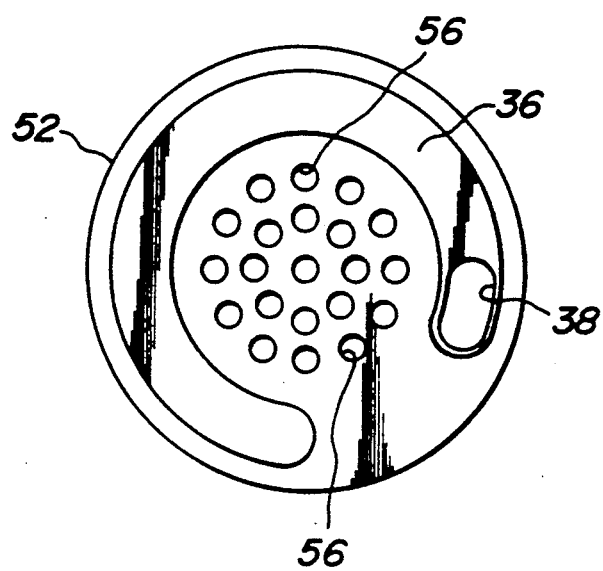
FIGS. 4 and 5 are top and bottom plan views of the partition member shown in FIG. 3, respectively.
Figure 5:
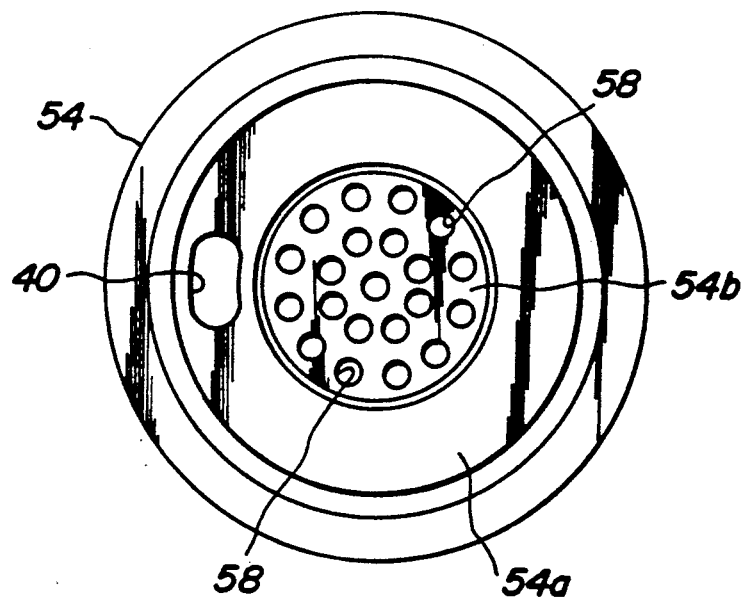
Figure 10:
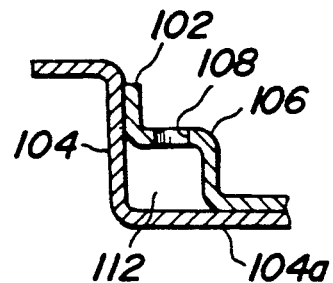
FIGS. 10 and 11 are sectional views taken along lines X—X and XI—XI of FIG. 9, respectively.
Figure 11:
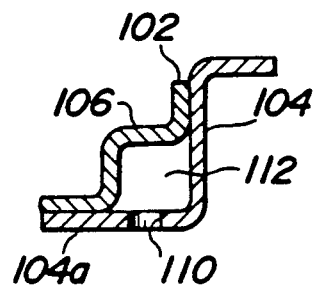

In the embodiment of FIG. 3, a partition member 50 is clamped between the cylindrical shell 46 and the diaphragm 22 to divide the liquid chamber 24 into the upper and lower liquid chambers 24A and 24B, and formed by the lapping of plate materials 52 and 54 as shown in FIGS. 4 and 5.

The plate material 52 is produced by stamping of the disc metal sheet and has substantially the same shape as the plate material 34, except that the central portion of the plate material 52 is provided with a plurality of small holes 56 in addition to the depression 36 and the opening 38. The plate material 54 is produced by deep drawing of the disc metal sheet and has substantially the same shape as the plate material 32, except that the central portion (54b) of the bottom recess 54a of the plate material 54 is further raised in an opposite direction and provided with a plurality of small holes 58.

As shown in FIG. 3, the radially extending peripheral portion of the plate material 54 is clamped between the cylindrical shell 46 and the diaphragm 22 to position the bottom recess 54a upwards, and the plate material 52 is lapped on and fixed to the top surface of the plate material 54. In this way, the restricted passage or orifice 40 is defined between the groove recess corresponding to the depression 36 of the plate material 52 and the plate material 54, and communicated with the upper and lower liquid chambers 24A and 24B through the openings 38 and 40. Further, a space 60 is formed between the central portions of the plate materials 52 and 54 in the lapping thereof, and communicates with the upper and lower liquid chambers 24A and 24B through small holes 56 and 58. In the space 60 is placed a disc-like membrane 62, which is made, for example, of a rubbery elastomer. The thickness and diameter of the membrane 62 are made smaller than the size of the space 60 to enable the slight movement of the membrane 62 in the space 60.

In the vibration isolating device of FIG. 3, therefore, the vibration-damping effect can be improved by the viscosity resistance of the liquid passing through the orifice 42 likewise the case of FIG. 1. Further, since the membrane 62 is existent in the space 60, high frequency vibrations having a small amplitude can be absorbed by the slight movement of the membrane 62 in the space 60.

In FIG. 6 is sectionally shown a third embodiment of the vibration isolating device according to the invention having substantially the same structure as that of FIG. 3, except that a partition member 70 is used instead of the partition member 50. In this case, the partition member 70 is constituted by lapping of plate materials 72 and 74. The plate material 72 is produced by stamping and punching the disc material sheet to form C-shaped depression 36 provided at one end portion with the opening 38, ring-like depression 76 adjacent to the depression 36 and central hole 78. The plate material 74 is produced by deep drawing and punching the disc metal sheet to form ring-like depression 76' and central hole 78' mating with the depression 76 and central hole 78 in the lapping of the plate materials 72 and 74. After the plate material 72 is fixed to the top surface of the plate material 74, disc-like membranes 80, 82 are secured at their outer peripheries to the depressions 76, 76', respectively, whereby a space 84 is airtightly defined between the membranes 80 and 82.

In the embodiment of FIG. 6, therefore, not only are vibrations damped by the viscosity resistance of the liquid passing through the orifice 40, but also high frequency vibrations are damped by absorbing the change of volumes of the upper and lower liquid chambers 24A and 24B through the elastic deformation of the membranes 80 and 82 in a direction of reducing the space 84. That is, the partition member 70 shown in FIG. 6 develops the same damping effect as in the partition member 50 of FIG. 3.

In FIG. 7 is sectionally shown a fourth embodiment of the vibration isolating device according to the invention, which has substantially the same structure as that of FIG. 1 except that a partition member 100 is used instead of the partition member 30. The partition member 100 is constituted by lapping a pair of plate materials 102 and 104 as shown in FIGS. 8 to 11. The plate material 102 is provided at the outer peripheral portion with a depression 106 of L-shaped section by deep drawing of the disc metal sheet, which extends in a C-shaped form and is provided near one end thereof with an opening 108. The plate material 104 is a hat-shaped body formed by deep drawing of the disc metal sheet and is clamped at the radially extending peripheral portion between the elastic diaphragm 22 and the rubber elastomer 14. In a recess bottom 104a of the plate material 104 is formed an opening 110 at a position near the other end of the depression 106 opposing to the opening 108.

In the embodiment of FIG. 7, a restricted passage or an orifice 112 is formed between the depression 106 and the plate material 104 by lapping the plate material 102 on the recess bottom 104a of the plate material 104 and fixing them to each other. This orifice 112 is in communication with the upper liquid chamber 24A through the opening 108 on the one hand and with the lower liquid chamber 24B through the opening 110 on the other hand.

Figure 12:
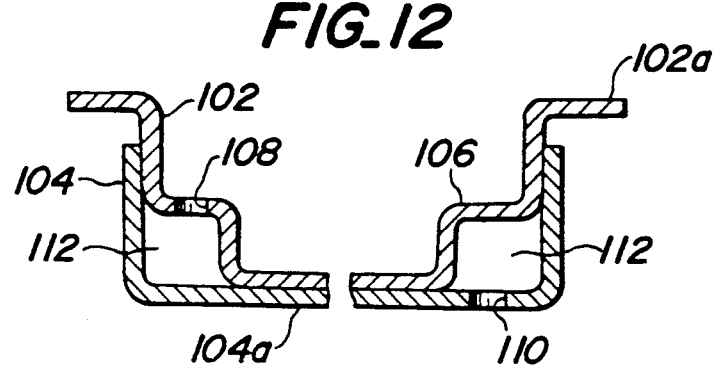
FIG. 12 is a sectional broken view of another embodiment of the partition member used in the invention.

FIG. 12 shows a modified embodiment of the partition member 100. In this case, the outer peripheral portion 102a of the plate material 102 is radially extended over the outer periphery of the plate material 104 in the lapping of these plate materials 102 and 104, and clamped between the elastic diaphragm 22 and the rubber elastomer 14 so as to divide the liquid chamber 24 into the upper and lower liquid chambers 24A and 24B.

Figure 13:
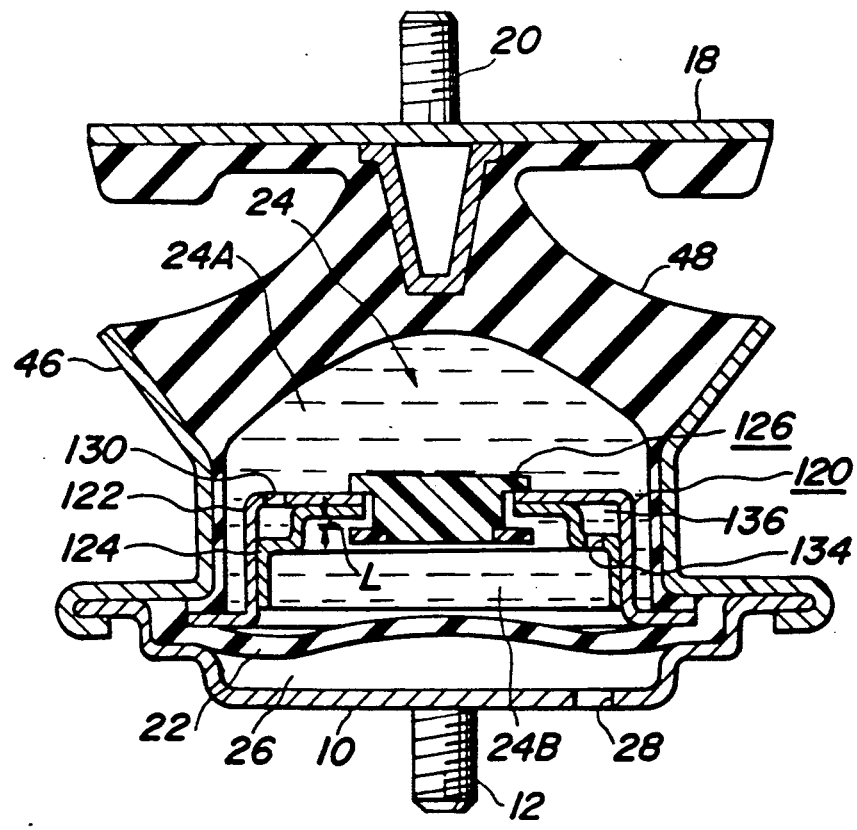
FIG. 13 is a sectional view of a fifth embodiment of the vibration isolating device according to the invention.

In FIG. 13 is sectionally shown a fifth embodiment of the vibration isolating device according to the invention. This device is also used as an engine mount for automobile vehicle and comprises the rigid bottom plate 10 provided at the central lower side with the fitting bolt 12, which is fixed to a vehicle chassis (not shown).

The cylindrical shell 46 is fixed by caulking at one end to the outer periphery of the bottom plate 10, and further the elastic diaphragm 22 is clamped at the outer peripheral portion between the bottom plate 10 and the cylindrical shell 46. Thus, the air chamber 26 is defined between the bottom plate 10 and the elastic diaphragm 22, and is in communication with the exterior through the hole 28 formed in the bottom plate 18. Therefore, the diaphragm 22 may be subjected to elastic deformation in a direction of expanding and reducing the air chamber 26.

The rubber elastic member 48 is bonded by vulcanization at the lower and outer periphery as a main vibration-absorbing body to the inner periphery of the upper part of the cylindrical shell 46. Of course, the other elastic material may be used instead of rubber. Further, the rubber elastic member 48 is bonded by vulcanization at the top surface to the lower surface of the top plate 18 provided with the fitting bolt 20 for carrying and fixing an engine (not shown). In this way, the liquid chamber 26 is defined by the diaphragm 22, cylindrical shell 46 and rubber elastic member 48, and filled with an incompressible liquid such as water or the like.

In the vibration isolating device of FIG. 13, a partition member 120 as shown in FIG. 14 is arranged in the liquid chamber 24 to divide it into the upper and lower liquid chambers 24A and 24B. This partition member 120 comprises a pair of plate materials 122 and 124 and a movable disc body 126. The plate material 122 is a hat-shaped body formed by deep drawing of the disc metal sheet and is clamped at the radially extending peripheral portion between the cylindrical shell 46 and the diaphragm 22. Further, the plate material 122 is provided at its central portion with a circular hole 128 for receiving the movable disc body 126 and near the outer periphery of its top portion 122a with an opening 130. On the other hand, the plate material 124 is provided at the outer peripheral portion with a depression 130 of L-shaped section by deep drawing of the disc metal sheet, which extends in a C-shaped form and is provided near one end thereof with an opening 134. Further, the plate material 124 is provided at the central portion with a circular hole 128' mating with the hole 128 in the lapping of these plate materials 122 and 124. Therefore, when the plate material 122 is lapped on the plate material 124 and fixed thereto, a restricted passage or an orifice 136 is defined between the depression 132 and the plate material 122, which is communicated with the upper liquid chamber 24A through the opening 130 on the one hand and with the lower liquid chamber 24B through the opening 132 on the other hand.

The movable disc body 126 is composed of an upper movable segment 126a and a lower movable segment 126b. The upper movable segment 126a is a cylindrical portion 140 having a diameter smaller than that of the hole 128, which is provided at the top with a flange portion 142 having a diameter larger than that of the hole 128 and at the bottom with a connection portion 144 having a diameter smaller than that of the cylindrical portion 140. The lower movable segment 126b has a diameter equal to that of the flange portion 142 and is provided at the central portion with a through-hole 146 fitting the connection portion 144. By fitting the connection portion 144 into the through-hole 146, the upper movable segment 126a is secured to the lower movable segment 126b to form an outer peripheral recess in the middle of the movable disc body 126. If necessary, the securing between both the segments can be ensured by applying an adhesive or the like to joint portion between the segments 126a and 126b.

The movable disc body 126 is preferably made of a synthetic resin having a bending modulus of $1,000 \sim 10,000$ kg/cm$^2$, whereby the occurrence of impact noise against the plate materials 122 and 124 can be prevented when damping the high-frequency vibrations. Further, when the specific gravity of the movable disc body 126 is approximately equal to that of the liquid filled in the liquid chamber 24, the movement of the movable disc body 32 is easy. Preferably, a ratio of the outer diameter of the movable disc body 126 to the inner diameter of the liquid chamber 24 is not less than 70%.

As shown in FIG. 13, the movable disc body 126 is movably retained by the plate materials 122 and 124 in such a manner that the flange portion 142 locates in the upper liquid chamber 24A and the lower movable segment 126b locates in the lower liquid chamber 24B. The length of the cylindrical portion 140 in the upper movable member 126a is longer than the total thickness of the plate materials 122 and 124 (by a size of L in FIG. 13). On the other hand, the diameter of the circular holes 128, 128' is larger than that of the cylindrical portion 140 but smaller than that of the flange portion 142. Therefore, the movable disc body 126 can move through the holes 128, 128' in up and down direction by the size L. Moreover, the size L is preferably within a range of 0.1~1 mm.

When the vibration isolating device of FIG. 13 is actually applied to the automobile vehicle, the dead weight of the engine is born by the fitting bolt 20, so that the pressure inside the upper liquid chamber 24A rises and is transferred to the lower liquid chamber 24B through the orifice 136, whereby the volume of the air chamber 26 is reduced. In the operation of the engine, vibrations generated from the engine are transmitted to the device through the top plate 18. As a result, the vibration can be absorbed by the damping performance of the rubber elastic member 48 based on the internal friction thereof. If the frequency of the vibration is low and its amplitude is large, the liquid flows between the upper and lower liquid chambers 24A and 24B through the orifice 136, during which the damping effect is enhanced by the flow resistance subjected to the liquid. In the embodiment of FIG. 13, the orifice 136 is the C-shaped long restricted passage, so that the vibration-absorbing effect is large. Of course, the length of the orifice 136 may optionally be adjusted by changing the relative angle between the openings 130 and 134 in the lapping of the plate materials 122 and 124.

When the vibrations of the engine have a high frequency of, for example, more than 50 Hz and a small amplitude, there is a possibility that the orifice 136 reaches a clogged state. In this case, however, the movable disc body 126 can move by the size L in up and down direction, so that the change in the volume of the upper or lower liquid chamber 24A or 24B is produced by the slight movement of the body 126, whereby the pressure increase is suppressed to provide a low dynamic spring constant for absorbing the high-frequency and small-amplitude vibrations.

In the embodiment of FIG. 13, the outer peripheral recess is formed over a whole periphery of the movable disc body 126, but such a recess may be formed in a part of the periphery of the body 126.

In FIGS. 15 and 16 are shown the other modified embodiments of the movable disc body 126. In the embodiment of FIG. 15, the upper movable segment 126'a has the same structure as the segment 126a except that plural engaging nibs 150 are protruded downward from the cylindrical portion 140 instead of the connection portion 144, while the lower movable segment 126'b has the same structure as the segment 126b except that plural small holes 152 capable of engaging with the engaging nibs 150 are formed instead of the through-hole 146. In the embodiment of FIG. 16, the upper movable segment 126"a of the movable disc body 126 is composed of a disc portion 154 and plural stepped pins 156 each protruding downward from the disc portion 154. Each small-diameter portion of the stepped pins 156 is inserted into the small hole 152 of the lower movable segment 126'b and fixed thereto by a suitable means. According to the invention, various structures of the movable disc body 126 may be adopted in addition to the illustrated embodiments.

As mentioned above, according to the invention, the partition member in the vibration isolating device is constituted by lapping a pair of plate materials, at least one of which being provided with a depression, so that the restricted passage or orifice can easily be formed in a simple structure. Further, the production cost for the formation of the orifice can be reduced.

What is claimed is:

1. A vibration isolating device comprising: two vibration-damping liquid chambers, an elastic member adjacent to at least one of said two liquid chambers, a partition member interposed between said two liquid chambers and provided with a restricted passage therein having a given length, said partition member comprising a pair of lapped thin metal sheets placed one on top of the other, at least one of which sheets being provided with a depression formed by deformation, said depression having a C-shape in plan view and having a depth larger than the thickness of said thin metal sheet, said depression defining an elongated horizontally extending and substantially C-shape hollow portion as said restricted passage in the lapping of said thin metal sheets, each of said sheets provided with an opening communicating with said restricted passage; and said given length of said restricted passage being changeable upon assembly of said vibration isolating device to define an effective length without changing a sectional area thereof by rotating one of said sheets with respect to the other.

2. A vibration isolating device according to claim 1, wherein one of said sheets is provided near the outer peripheral portion with said depression and at the central portion with plural small holes, and the other sheet is upheaved at the central portion and provided at the upheaved portion with plural small holes, and a disc-like membrane is placed in a space defined between the central portions of said sheets in the lapping thereof.

3. A vibration isolating device according to claim 1, wherein one of said sheets is provided at the outer peripheral portion with said depression and a ring-like depression adjoining inward to said depression and at the central portion with a central hole, and the other sheet is provided with a ring-like depression and a central hole mating with said ring-like depression and a central hole in the lapping of said sheet, and a disc-like membrane is secured at the outer periphery to each of said ring-like depressions.

4. A vibration isolating device according to claim 1, wherein one of said sheets is provided near the outer peripheral portion with said depression and at the central portion with a circular hole, and the other sheet is provided at the central portion with a circular hole, and said one sheet is movably retained in the central portion of said other sheet in the lapping of said other sheet.

* * * * *